(12) United States Patent
Mills

(10) Patent No.: US 10,344,911 B2
(45) Date of Patent: Jul. 9, 2019

(54) TILT MECHANISM

(71) Applicant: Colebrook Bosson Saunders (Products) Limited, London (GB)

(72) Inventor: Jonathan Mills, Sheffield (GB)

(73) Assignee: COLEBROOK BOSSON SAUNDERS (PRODUCTS) LIMITED, London (GB)

(*) Notice: Subject to any disclaimer, the term of this patent is extended or adjusted under 35 U.S.C. 154(b) by 0 days.

(21) Appl. No.: 15/270,877

(22) Filed: Sep. 20, 2016

(65) Prior Publication Data

US 2018/0080596 A1     Mar. 22, 2018

(51) Int. Cl.
*F16M 11/10* (2006.01)
*F16M 11/20* (2006.01)

(52) U.S. Cl.
CPC ......... *F16M 11/10* (2013.01); *F16M 11/2007* (2013.01); *F16M 11/2014* (2013.01); *F16M 2200/022* (2013.01); *F16M 2200/068* (2013.01)

(58) Field of Classification Search
USPC ......... 248/274.1, 276.1, 278.1, 282.1, 284.1, 248/299.1, 923, 922, 133, 139, 140, 142, 248/371, 372.1; 361/679.02, 679.06, 361/679.07
See application file for complete search history.

(56) References Cited

U.S. PATENT DOCUMENTS

| 531,054 A | 12/1894 | McCoy |
| 1,578,634 A | 3/1926 | Borgmann |
| 4,621,782 A | 11/1986 | Carlson et al. |
| 4,880,191 A | 11/1989 | Lake, Jr. |
| 5,016,851 A * | 5/1991 | Koskinen ............ B60R 11/0241 248/278.1 |
| 5,209,446 A * | 5/1993 | Kawai ................. F16M 11/126 108/139 |

(Continued)

FOREIGN PATENT DOCUMENTS

| CA | 2512685 | 3/2012 |
| CN | 101410664 | 11/2011 |

(Continued)

OTHER PUBLICATIONS

Colebrook bosson saunders, "P005 Dynamic arm," May 2016 (9 pages).

(Continued)

*Primary Examiner* — Terrell L McKinnon
*Assistant Examiner* — Michael McDuffie
(74) *Attorney, Agent, or Firm* — Michael Best & Friedrich LLP

(57) ABSTRACT

A tilt mechanism for a display device support apparatus including a base member and a tilt head. The base member includes a bearing portion, a mounting portion, and a fastener recess. The tilt head includes an attachment portion and a sliding portion. The attachment portion is configured to couple the tilt head to a mounting plate, and the sliding portion engages the bearing portion. A friction member engages the tilt head and applies a friction force to the tilt head. A mounting fastener extends through a portion of the base and is connected to the friction member. The mounting fastener has a head that is positioned in the recess. The mounting fastener sets the amount of friction force on the tilt head.

21 Claims, 6 Drawing Sheets

(56) References Cited

U.S. PATENT DOCUMENTS

| | | | | |
|---|---|---|---|---|
| 5,553,820 | A | * | 9/1996 | Karten ............... A47B 21/0314 |
| | | | | 248/181.2 |
| 5,662,422 | A | | 9/1997 | Fort |
| 5,692,721 | A | * | 12/1997 | Roberts ................. B60R 11/00 |
| | | | | 248/278.1 |
| 6,068,227 | A | * | 5/2000 | Morgan ................ F16M 11/08 |
| | | | | 248/184.1 |
| 6,116,560 | A | | 9/2000 | Kim |
| RE36,978 | E | | 12/2000 | Moscovitch |
| 7,028,961 | B1 | | 4/2006 | Dittmer et al. |
| 7,152,836 | B2 | | 12/2006 | Pfister et al. |
| 7,178,775 | B2 | | 2/2007 | Pfister et al. |
| 7,241,069 | B2 | | 7/2007 | Richter |
| 7,438,269 | B2 | | 10/2008 | Pfister et al. |
| 7,464,909 | B2 | * | 12/2008 | Li ......................... F16M 11/08 |
| | | | | 248/274.1 |
| 7,694,927 | B2 | * | 4/2010 | Chuang ............... F16M 11/041 |
| | | | | 248/276.1 |
| 7,753,329 | B2 | * | 7/2010 | Hanson ................ B60J 3/0226 |
| | | | | 248/183.1 |
| 8,040,669 | B2 | * | 10/2011 | Chen ..................... F16M 11/10 |
| | | | | 248/157 |
| 8,235,342 | B2 | | 8/2012 | Pfister et al. |
| 8,246,266 | B2 | | 8/2012 | Lang et al. |
| 8,251,325 | B2 | * | 8/2012 | Molter ................. F16M 11/105 |
| | | | | 248/221.12 |
| 8,480,049 | B2 | | 7/2013 | Yeo et al. |
| 8,542,499 | B2 | * | 9/2013 | Skull ...................... B32B 27/08 |
| | | | | 361/825 |
| 8,632,042 | B2 | * | 1/2014 | Hoel ................. F16M 11/2071 |
| | | | | 248/278.1 |
| 8,640,998 | B2 | | 2/2014 | Lau et al. |
| 9,016,645 | B2 | * | 4/2015 | Simpson ............... F16M 13/02 |
| | | | | 248/278.1 |
| 9,316,346 | B2 | | 4/2016 | Lau et al. |
| 2002/0084396 | A1 | * | 7/2002 | Weaver ................. F16M 11/10 |
| | | | | 248/278.1 |
| 2003/0132356 | A1 | * | 7/2003 | Copeland ............ F16M 11/041 |
| | | | | 248/282.1 |
| 2003/0136888 | A1 | | 7/2003 | Boele |
| 2006/0022102 | A1 | * | 2/2006 | Dittmer ............... F16M 11/041 |
| | | | | 248/276.1 |
| 2007/0090250 | A1 | * | 4/2007 | O'Keene .............. F16M 11/10 |
| | | | | 248/299.1 |
| 2007/0096606 | A1 | | 5/2007 | Ryu |
| 2007/0102607 | A1 | * | 5/2007 | Koh ..................... F16M 11/10 |
| | | | | 248/276.1 |
| 2008/0054146 | A1 | | 3/2008 | Hermsen et al. |
| 2008/0061199 | A1 | | 3/2008 | Chen |
| 2011/0303803 | A1 | | 12/2011 | Skinner et al. |
| 2011/0303805 | A1 | | 12/2011 | Lau et al. |
| 2011/0315843 | A1 | * | 12/2011 | Hung ................... F16M 11/041 |
| | | | | 248/279.1 |
| 2013/0134271 | A1 | * | 5/2013 | Lee ........................ H01Q 1/125 |
| | | | | 248/219.2 |
| 2013/0314890 | A1 | | 11/2013 | Smith |
| 2014/0252189 | A1 | | 9/2014 | Kifer et al. |

FOREIGN PATENT DOCUMENTS

| | | |
|---|---|---|
| EP | 2083207 | 7/2009 |
| EP | 1618329 | 6/2013 |
| NL | 1012836 | 2/2001 |
| NL | 1032397 | 3/2008 |
| WO | 2004063618 | 7/2004 |
| WO | 2004063619 | 7/2004 |

OTHER PUBLICATIONS

International Search Report and Written Opinion for Application No. PCT/ZGB2017/052791 dated Jan. 5, 2018, 13 pages.

* cited by examiner

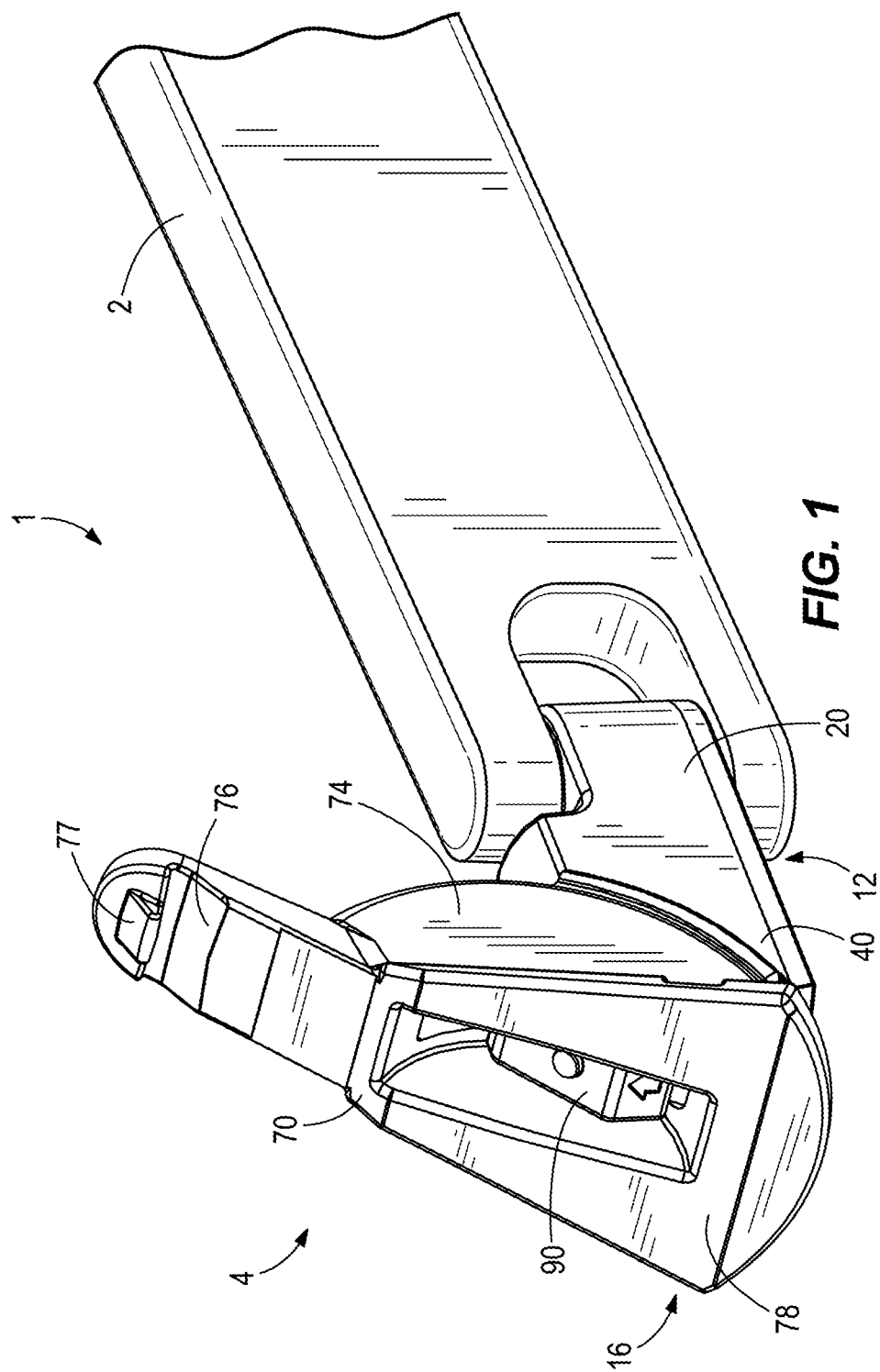

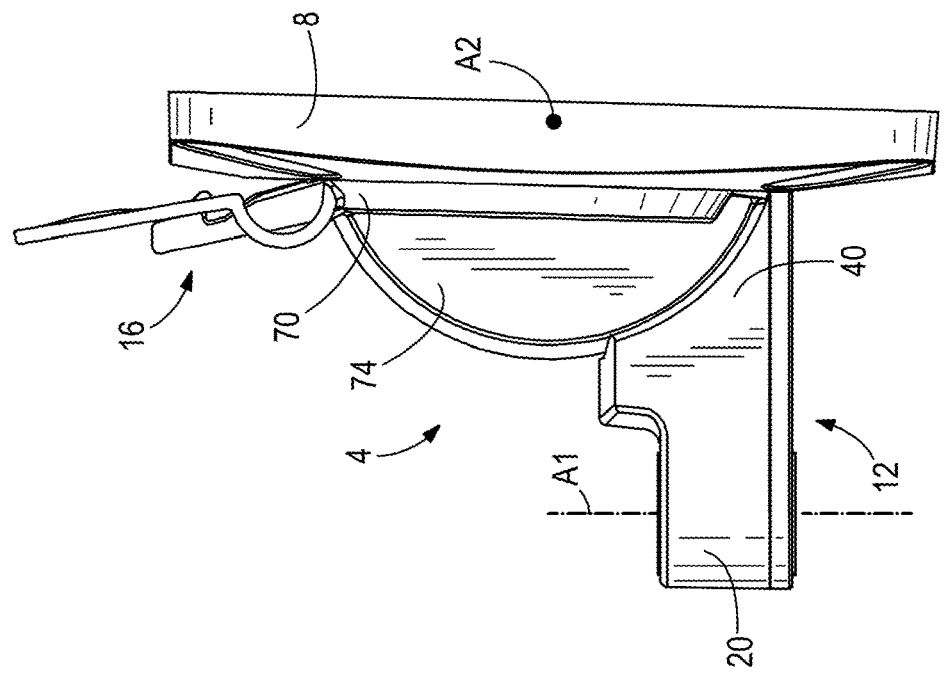
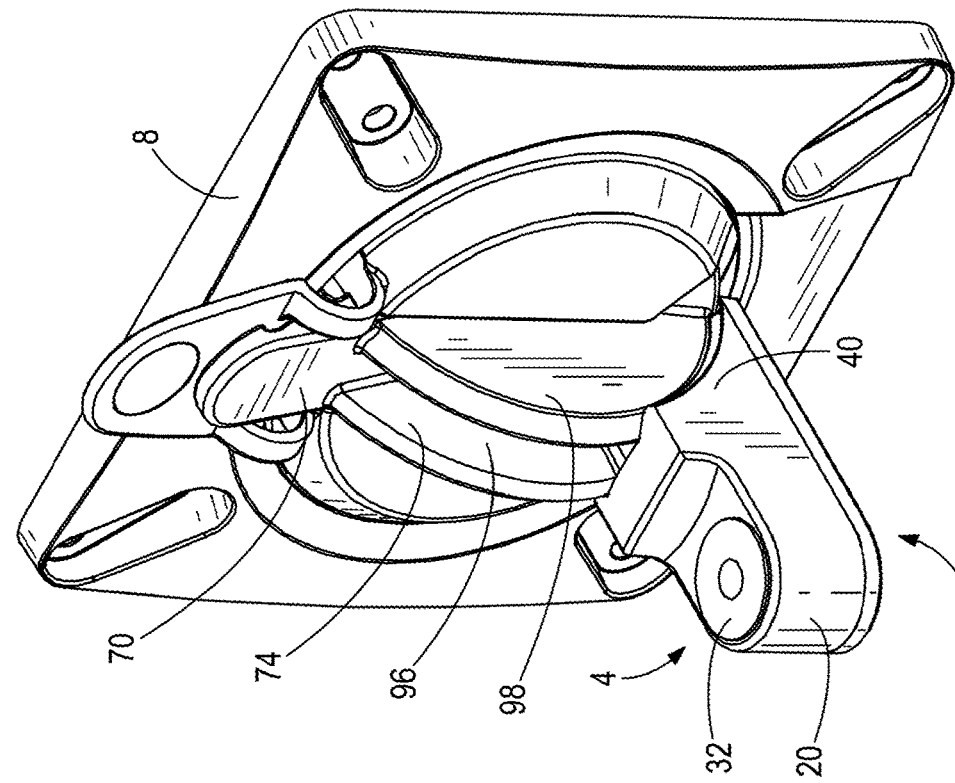

TILT MECHANISM

BACKGROUND

Various exemplary embodiments relate to support systems used to moveably support a display, such as flat-screen monitors or TVs.

Modern displays, including TVs and computer monitors utilize a flat screen. Such flat-screen displays have the advantage of being slim and light, and therefore can be mounted on elevated support devices such as a support arm, which can be secured to a work surface such as a desk or table so that the flat-screen monitor is suspended above the work surface. This arrangement is also neat and aesthetically attractive.

In order for such a support device to be practical, it must be adjustable so that a user can position the flat-screen display in the most appropriate position for use. However, many support devices are not easily adjustable and/or are complicated and expensive to manufacture. In addition, conventional means by which support posts are mounted to a desk or table top can be crude and unattractive.

SUMMARY

In one exemplary embodiment, a tilt mechanism for a display device support apparatus includes a base member and a tilt head. The base member includes a bearing portion, a mounting portion, and a fastener recess. The tilt head includes an attachment portion and a sliding portion. The attachment portion is configured to couple the tilt head to a mounting plate. The sliding portion engages the bearing portion. A friction member engages the tilt head and applies a friction force to the tilt head. A mounting fastener extends through a portion of the base and is connected to the friction member. The mounting fastener has a head that is positioned in the recess. The mounting fastener sets the amount of friction force on the tilt head.

In another exemplary embodiment, a tilt mechanism for a display device support apparatus includes a base member having a mounting portion and a bearing portion. The mounting portion includes an aperture for rotatably connecting the base member to a support arm and the bearing portion includes a first rail having a first angled surface and a second rail having a second angled surface. A tilt head is rotatably connected to the base member. The tilt head includes a sliding portion having a first side member with a third angled surface and a second side member with a fourth angled surface. The third angled surface corresponds to and engages the first angled surface. The fourth angled surface corresponds to and engages the second angled surface.

In another exemplary embodiment, a method of adjusting a tilt mechanism for a display support apparatus includes providing a base member having a bearing portion and a tilt head having a sliding portion, wherein the sliding portion engages the bearing portion. The tilt head is engaged with a friction member operable to apply a friction force to the tilt head. A mounting fastener extends through a portion of the base member. The mounting fastener is connected to the friction member to secures the tilt head to the base member. The mounting fastener is rotated to increase or decrease the amount of the friction force on the tilt head. The tilt head is adjusted by moving the tilt head relative to the bearing portion, wherein the sliding portion slides within the bearing portion during adjustment.

Other embodiments will become apparent by consideration of the detailed description and accompanying drawings.

BRIEF DESCRIPTION OF THE DRAWINGS

FIG. 1 is a perspective view of an exemplary tilt mechanism attached to a support.

FIG. 2A is a rear perspective view of an exemplary tilt mechanism attached to a mounting plate.

FIG. 2B is a side view of the tilt mechanism attached to a mounting plate shown in FIG. 2.

DETAILED DESCRIPTION

Figure 3:
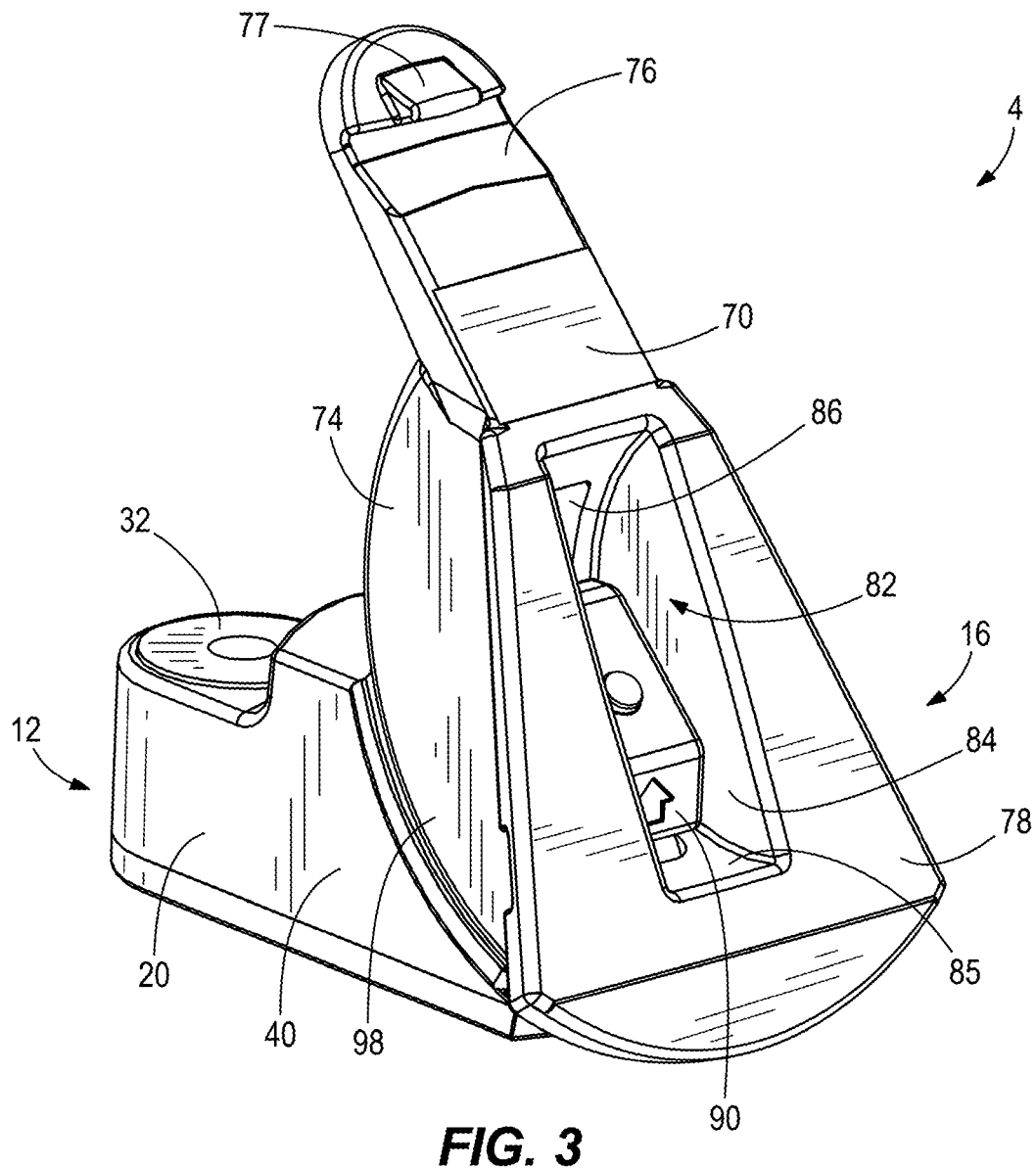
FIG. 3 is a perspective view of an embodiment of a tilt mechanism.

FIG. 1 shows an exemplary embodiment of a support apparatus 1 having a support arm 2 and a tilt mechanism 4. The support apparatus 1 can be configured to serve as a monitor arm or a support device used to moveably support televisions or other display devices used in computers, computer devices or other electronic equipment. Only a distal portion of the support arm 2 is shown. A proximal portion of the support arm (not shown) can include a mounting mechanism, such as a clamp, bracket, or weighted support that is sized and configured to hold or retain the support apparatus on a support surface. The support surface can be an article of furniture, such as a desk or tabletop, or a structure, such as a wall, floor, or ceiling. The mounting mechanism can include or receive one or more fasteners to attach the support apparatus to the support surface.

The tilt mechanism 4 is pivotally connected to the distal portion of the support arm 2 and a mounting plate 8 can be connected to the tilt mechanism 4, as shown in FIGS. 2A and 2B. The mounting plate 8 is configured such that a display (i.e., LCD monitors, plasma screens, or flat-screen displays) can be attached to a front face of the mounting plate 8. The tilt mechanism 4 is coupled to one end of a support arm 2, as shown in FIG. 1. The other end of the support arm 2 can be mounted to a surface, such as the surface of a wall, a workstation or an upright pole (not shown). The support arm 2 provides adjustable support for the weight of the display when the display is mounted on the mounting plate 8.

As shown in FIGS. 2A and 2B, the tilt mechanism 4 includes a base member 12 and a tilt head 16 moveably connected to the base member 12. The base member 12 is connected to the support arm 2 so that the base member 12 can rotate relative to the support arm 2 about a first axis A1. The tilt head 16 connects to the base member 12 so that the tilt head 16 can rotate relative to the base member 12 about a second axis A2. The tilt head 16 connects to a display device, for example through the mounting plate 8. In an exemplary embodiment, the second axis is a virtual pivot point spaced from the tilt mechanism 4. In some embodiments, the second axis can extend through the mounting plate 8.

FIGS. 3-7 show the tilt mechanism in greater detail. The base member 12 includes a mounting portion 20 that connects the base member 12 to the support arm 2. For example, the mounting portion 20 has an aperture 22 for receiving a portion of the support arm 2 or a fastener that connects the base member 12 to the support arm 2. The aperture 22 has a top counterbore 26 and a bottom counterbore 28, each having a larger diameter than a central interior of the aperture 22. A first gasket 32 and a second gasket 34 are positioned in the aperture 22 to assist in retaining the position of the base member 12 relative to the support arm 2. The first and second gaskets 32, 34 each include a flange, a body, and a through hole. The first gasket 32 is positioned in an upper portion of the aperture 22 so that the flange is positioned in the top counterbore 26 and the body extends into the central interior of the aperture 22. The second gasket 34 is similarly positioned in a lower portion of the aperture 22. In an exemplary embodiment, the first and second gaskets 32, 34 engage a fastener (e.g., a bolt or screw) that connects the base member 12 to the support arm 2, providing resistance to movement of the base member 12 relative to the support arm 2.

Figure 4:
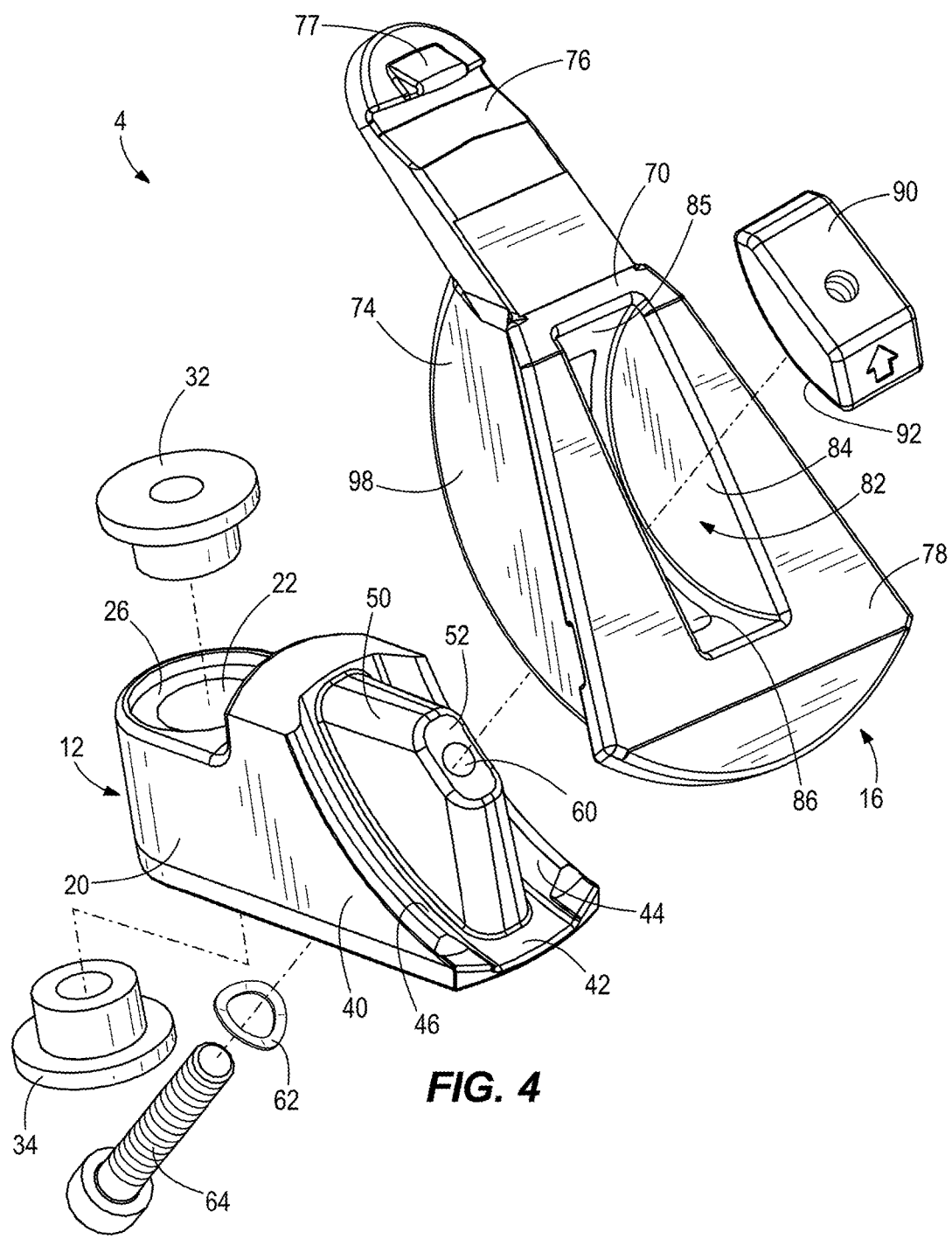
FIG. 4 is an exploded view of the tilt mechanism shown in FIG. 3.
Figure 6:
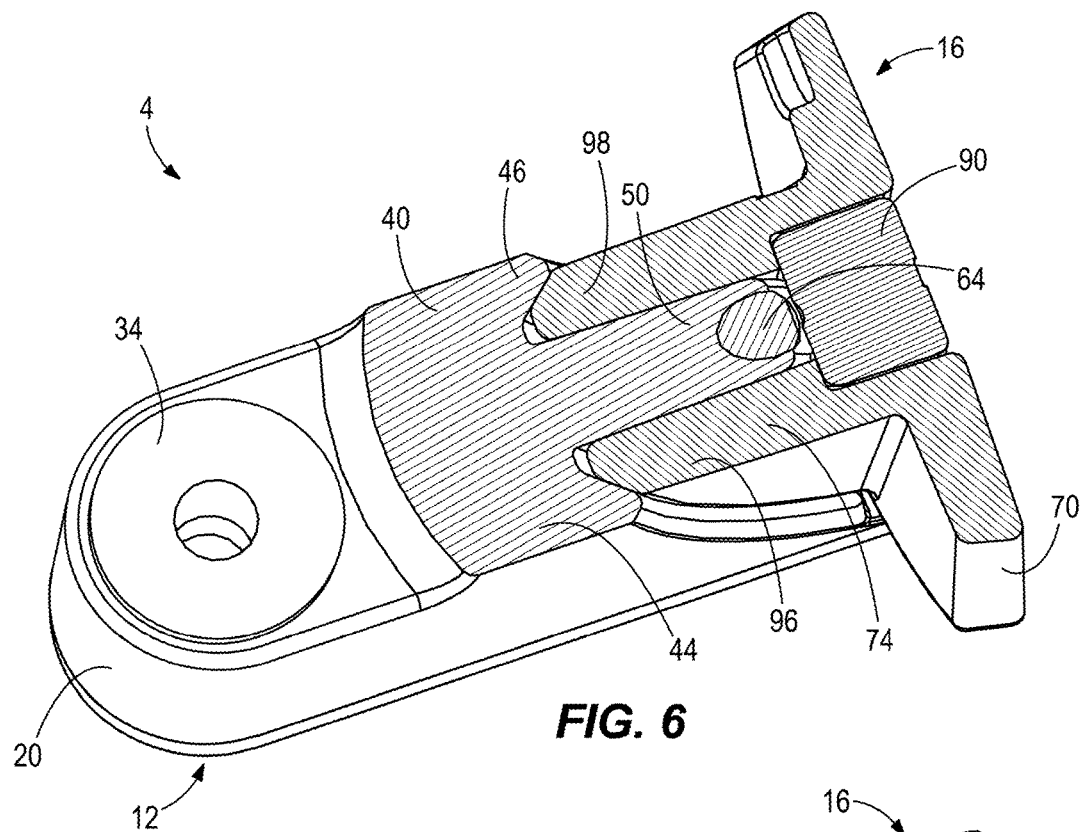
FIG. 6 is a cross-sectional bottom view of the tilt mechanism shown in FIG. 3.
Figure 7:
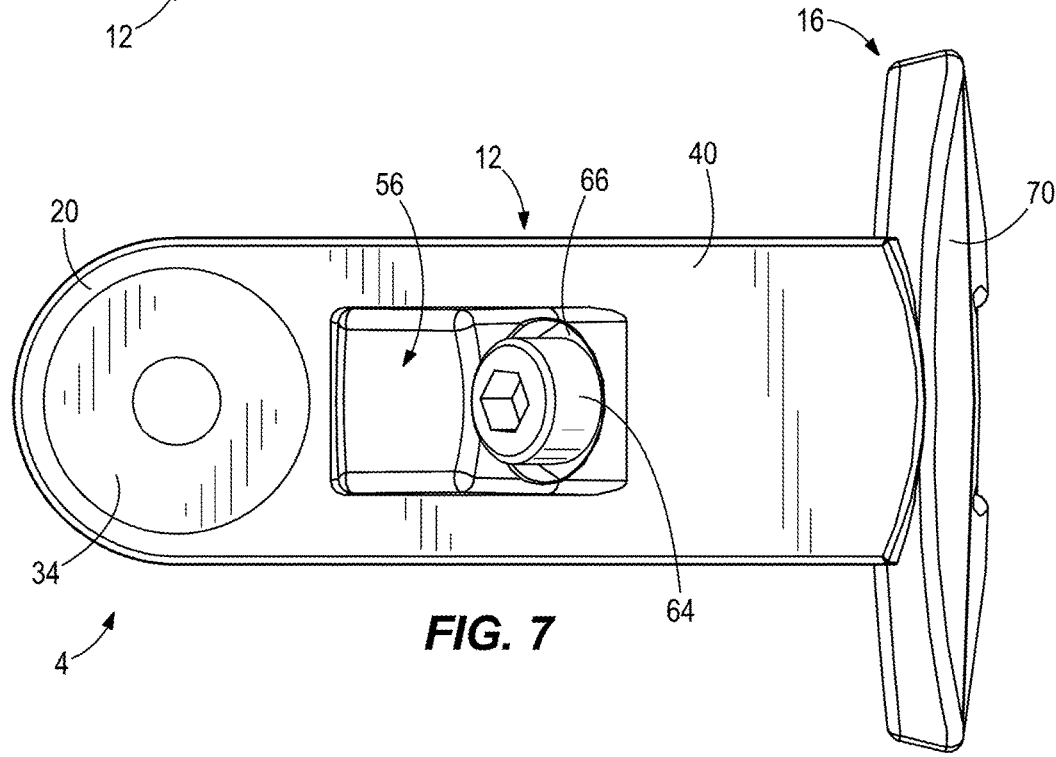
FIG. 7 is a bottom view of the tilt mechanism shown in FIG. 3.

The base member 12 also includes a bearing portion 40 having a generally curved surface 42 that is configured to slidably receive the tilt head 16. The bearing portion 40 extends from the top to the bottom of the base member 12. As shown in FIGS. 4 and 6, the bearing portion 40 includes a first outer rail 44 and a second outer rail 46. The first and second outer rails 44, 46 each have an angled surface, for example a chamfered edge, that engage a portion of the tilt head 16. The tilt head 16 slides within the first and second outer rails 44, 46, allowing for the adjustment of the tilt head angle.

Figure 5:
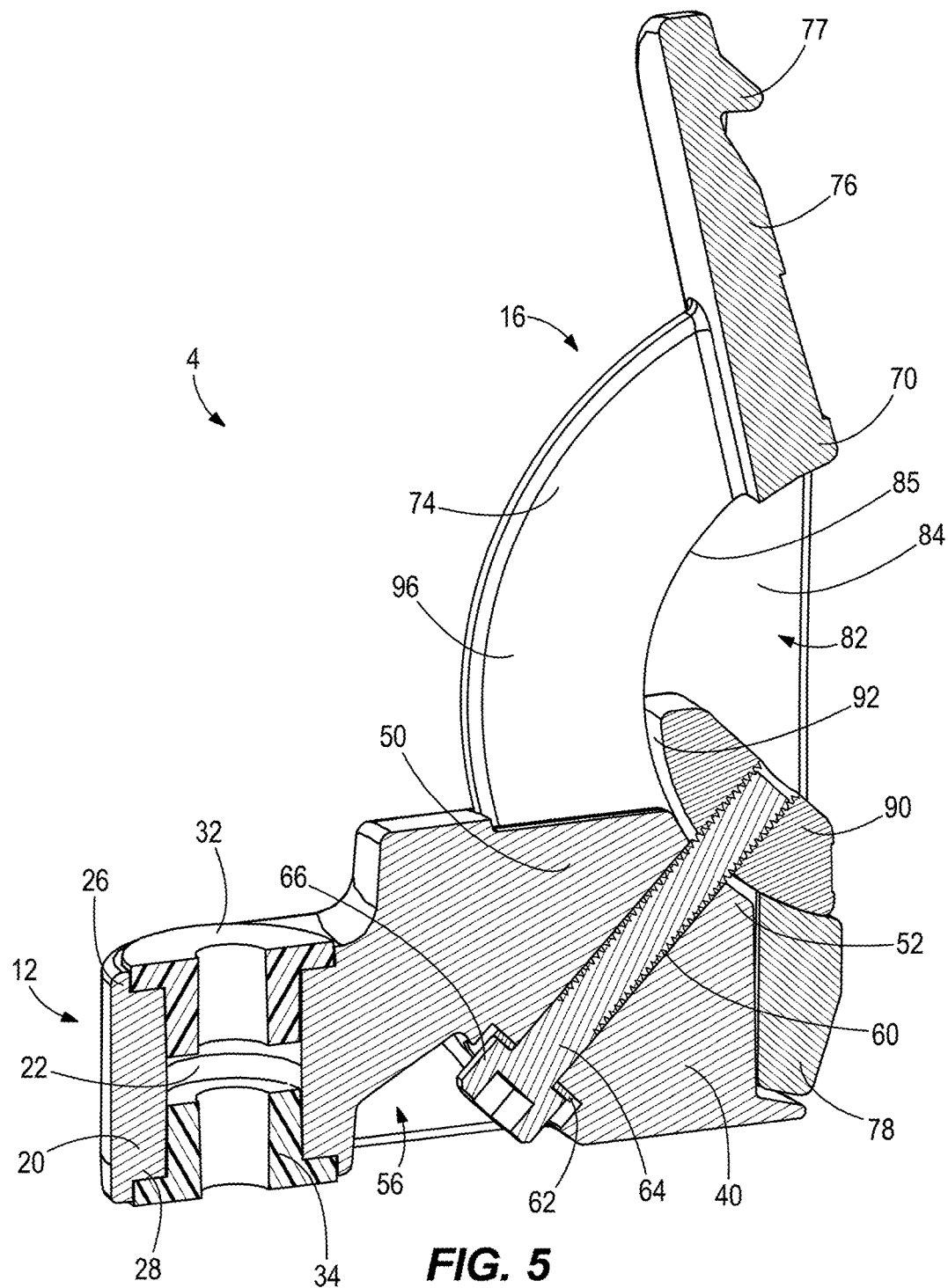
FIG. 5 is a cross-sectional side view of the tilt mechanism shown in FIG. 3.

The base member 12 includes a projection 50 extending from the curved surface 42 of the bearing portion 40. The projection 50 is tapered from a base to an apex 52 which has a curved outer surface. In other exemplary embodiments, the apex 52 has a flat outer surface. As shown in FIG. 5, a recess 56 is formed in a bottom surface of the base member and a through hole 60 extends from the recess 56 through the projection 50. The through hole 60 is configured to receive a mounting fastener 64 (for example a mounting screw), which secures the tilt head 16 to the base member 12. The through hole 60 and the mounting fastener 64 can be closely tolerance so that there is little to no excessive free play between the two, which helps prevent jamming during movement of the tilt head 16. The recess 56 includes a counterbore 66 for receiving one or more fastener components, for example the head of the mounting fastener 64 and a spring washer 62. As shown in FIG. 5, the spring washer 62 is received within the counterbore 66 between the head of the mounting fastener 64 and the bearing portion 40.

As shown in FIGS. 3-6, the tilt head 16 includes an attachment portion 70 and a sliding portion 74. As shown in FIGS. 3-5, the attachment portion 70 includes an upper portion 76 and a lower portion 78. The upper portion 76 has a tab 77 that is configured to releasably couple the mounting plate 8 to the tilt head 16. In some embodiments, the tab 77 may be snapped or clipped to the mounting plate 8. The lower portion 78 provides support for the mounting plate 8 as the tilt head 16 is rotated through different positions. An opening 82 is provided in the lower portion 78 allowing access to a recessed area 84 adjacent the sliding portion 74.

The sliding portion 74 includes a curved front surface 85 facing the recessed area 84. A slot 86 is provided in the sliding portion 74 that is in communication with the projection 50. A friction member 90 is positioned in the recessed area 84 and connected by the mounting fastener 64 to engage at least a portion of the curved front surface 85.

In an exemplary embodiment, the friction member 90 is a compressible gasket including an elastomeric material having a threaded aperture that receives a mounting screw, although other connection methods can be used. In an exemplary embodiment, at least a portion of the apex 52 curved outer surface has the same radius of curvature as a portion of the curved front surface 85 of the sliding portion 74.

As shown in FIG. 5, the curvature of the curved front surface 85 corresponds to a curved outer surface 92 of the friction member 90. The corresponding curvatures of the curved front surface 85 and the curved outer surface 92 allow the tilt head 16 to slide relative to the friction member 90. The friction member 90 and mounting fastener 64 secure the tilt head 16 to the base member 12 and allows for the pivotable adjustment of the tilt head 16. The mounting fastener 64 can set the amount of friction force on the tilt head 16. In the exemplary embodiment shown, by tightening the mounting fastener 64, pressure is applied to the spring washer 62 and gradually compresses the spring washer 62 while simultaneously gradually increasing the pressure applied to the friction member 90, thus increasing the force needed to move the tilt head 16 relative to the base 12. By loosening the mounting fastener 64, pressure is relieved from the spring washer 62 and gradually decompresses the spring washer 62 while simultaneously gradually relieving pressure from the friction member 90, thus decreasing the force needed to move the tilt head 16 relative to the base 12. The mounting fastener 64 can therefore be tightened to retain the position of a display at a desired tilt angle. Use of the spring washer 62 allows for more precise control of the friction force. In other exemplary embodiments, the mounting fastener 64 can apply a fixed load (e.g., with a rivet fastener) to the friction member 90 to retain the position of a display at a desired tilt. In some embodiments, the mounting fastener 64 is reversed such that the head of the mounting fastener 64 is in communication with the friction member 90 when tightened. In this exemplary embodiment, the pivotable adjustment of the tilt head 16 is produced in a similar fashion as described above.

As shown in FIG. 6, the sliding portion 74 includes a first side portion 96 and a second side portion 98. The first and second side portions 96, 98 each include a rear curved surface facing the bearing portion 40, such that the first and second side portions 96, 98 have an arch-like shaped. The rear curved surfaces have an angled surface, for example a chamfered edge, which corresponds to the chamfered surfaces of the first and second outer rails 44, 46 of the bearing portion 40, respectively. The chamfered surfaces of the first and second side portions 96, 98 and the first and second outer rails 44, 46 allow for the tilt head 16 to be slidably engaged with the bearing portion 40 of the base member 12. As shown in FIG. 6, a space between the inner surfaces of the first and second side portions 96, 98 defines an opening that receives the projection 50.

By tightening the mounting fastener 64, the chamfered surfaces of the first and second outer rails 44, 46 push or squeeze the first and second side portions 96, 98 into contact with the projection 50 producing friction between the inner surfaces of the first and second side portions 96, 98 and the projection 50. As the mounting fastener 64 tightens, the friction increases between the first and second side portions 96, 98 and the projection 50 therefore increasing the force needed to move the tilt head 16 relative to the base 12. Thus, this exemplary embodiment allows for the pivotable adjustment of the tilt head 16 in which the ease of adjustment is dependent on the amount the mounting fastener 64 is tightened within the friction member 90 of the tilt head 16 as described above.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed is:

1. A tilt mechanism for a display device support apparatus comprising:
   a support configured to be connected to a structure;
   a base member including a bearing portion, a mounting portion, and a fastener recess, wherein the mounting portion is connected to the support and the bearing portion is positioned opposite the mounting portion;
   a tilt head including an attachment portion and a sliding portion, wherein the attachment portion is configured to couple the tilt head to a mounting plate, and the sliding portion engages the bearing portion;
   a friction member engaging the tilt head and applying a friction force to the tilt head; and
   a mounting fastener extending through a portion of the base and connected to the friction member, the mounting fastener having a head that is positioned in the recess, and wherein the mounting fastener sets the amount of the friction force on the tilt head,
   wherein the tilt head is slidably moveable relative to the base member through a continuous range of motion, and wherein the base member supports the tilt head during movement through the range of motion.

2. The tilt mechanism of claim 1, wherein the mounting portion includes an aperture having a top counterbore and a bottom counterbore for connecting the base member to a support arm.

3. The tilt mechanism of claim 2, wherein the top counterbore receives a first gasket and the bottom counterbore receives a second gasket.

4. The tilt mechanism of claim 1, wherein the bearing portion has a first outer rail and a second outer rail.

5. The tilt mechanism of claim 4, wherein the first outer rail has a first chamfered surface and the second outer rail has a second chamfered surface.

6. The tilt mechanism of claim 1, wherein a washer is arranged within the fastener recess.

7. The tilt mechanism of claim 1, wherein the recess includes a counterbore receiving the mounting fastener head.

8. The tilt mechanism of claim 1, wherein rotation of the mounting fastener increases or decreases the amount of the friction force on the tilt head.

9. The tilt mechanism of claim 1, wherein the tilt head includes a recess receiving the friction member.

10. The tilt mechanism of claim 9, wherein the sliding portion includes a curved front surface in communication with the recess and the friction member includes a curved outer surface corresponding to the curved front surface.

11. A tilt mechanism for a display device support apparatus comprising:
    a base member including a mounting portion and a bearing portion, wherein the mounting portion includes an aperture for rotatably connecting the base member to a support arm and the bearing portion includes a first rail having a first obliquely angled surface and a second rail having a second obliquely angled surface; and
    a tilt head rotatably connected to the base member, the tilt head including a sliding portion slidably engaging the bearing portion having a first side member with a third obliquely angled surface and a second side member with a fourth obliquely angled surface, the third obliquely angled surface corresponding to and engaging the first obliquely angled surface and the fourth obliquely angled surface corresponding to and engaging the second obliquely angled surface.

12. The tilt mechanism of claim 11, wherein the first angled surface and the third angled surface are defined by a chamfered edge.

13. The tilt mechanism of claim 11, wherein the first and second side portions are curved.

14. The tilt mechanism of claim 11, wherein the first side member is spaced from the second side member and a protrusion extends from the base member between the first and second side member.

15. The tilt mechanism of claim 14, wherein a friction member engages the tilt head and a fastener extends through the protrusion and connects to the friction member.

16. The tilt mechanism of claim 15, wherein rotation of the fastener increases or decreases the amount of a friction force on the tilt head.

17. A method of adjusting a tilt mechanism for a display device support apparatus, the method comprising:
    providing a base member including a bearing portion and a tilt head including a sliding portion, wherein the bearing portion includes a first rail having a first angled surface and a second rail having a second angled surface, and the sliding portion includes a first side member with a third angled surface and a second side member with a fourth angled surface, the third angled surface corresponding to and engaging the first angled surface and the fourth angled surface corresponding to and engaging the second angled surface;
    engaging the tilt head with a friction member operable to apply a friction force to the tilt head;
    extending a mounting fastener through a portion of the base member;
    connecting the mounting fastener to the friction member, wherein connecting the mounting fastener to the friction member secures the tilt head to the base member;
    rotating the mounting fastener to increase or decrease the amount of the friction force on the tilt head; and adjusting the tilt head by moving the tilt head relative to the bearing portion, wherein the sliding portion slides within the bearing portion during adjustment, and wherein the friction force of the tilt head can be set so the tilt head supports a display device in a stationary manner and also allows for adjustment of the position of the tilt head by a user without rotating the mounting fastener.

18. The method of claim 17, wherein rotating the mounting fastener to increase the friction force on the tilt head increases the force needed to move the tilt head relative to the base member.

19. The method of claim 18, wherein increasing the friction force on the tilt head retains a position of the display at a desired angle.

20. The method of claim 17, wherein rotating the mounting fastener to decrease the friction force on the tilt head decreases the force needed to move the tilt head relative to the base member.

21. The tilt mechanism of claim 1, wherein the base member can remain stationary between supporting a load connected to the tilt head and adjustment of the position of the load by moving the tilt head relative to the base.

* * * * *